United States Patent
Hogh et al.

(10) Patent No.: US 8,100,547 B2
(45) Date of Patent: Jan. 24, 2012

(54) SERVICE APPARATUS WITH AN ILLUMINATOR AND AN AIR SHOWER

(75) Inventors: Robert Hogh, Hamburg (DE); Jochen Mueller, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 12/573,977

(22) Filed: Oct. 6, 2009

(65) Prior Publication Data

US 2010/0093267 A1    Apr. 15, 2010

Related U.S. Application Data

(60) Provisional application No. 61/195,813, filed on Oct. 10, 2008.

(30) Foreign Application Priority Data

Oct. 10, 2008 (DE) .................. 10 2008 051 251

(51) Int. Cl.
 *F21V 33/00* (2006.01)
(52) U.S. Cl. .................................. 362/96; 362/523
(58) Field of Classification Search .......... 362/96, 362/149, 218, 234, 227, 287, 294, 364, 365, 362/372, 373, 421, 464, 480, 487, 523, 528, 362/540, 543, 545, 800
See application file for complete search history.

(56) References Cited

U.S. PATENT DOCUMENTS

| | | | | |
|---|---|---|---|---|
| 2,153,242 | A  * | 4/1939 | Dreyfuss | 362/480 |
| 4,681,024 | A  * | 7/1987 | Ivey | 454/233 |
| 5,873,644 | A  * | 2/1999 | Roessner et al. | 362/551 |
| 6,364,512 | B1 * | 4/2002 | Logel | 362/490 |
| 6,523,984 | B2 * | 2/2003 | Belfer | 362/551 |
| 6,655,823 | B2 * | 12/2003 | Chang | 362/487 |
| 7,527,402 | B2 * | 5/2009 | Scown et al. | 362/480 |

FOREIGN PATENT DOCUMENTS

| | | |
|---|---|---|
| DE | 19500301 A1 | 7/1995 |
| DE | 4428742 A1 | 2/1996 |
| DE | 29916102 U1 * | 2/2000 |
| DE | 19847884 A1 | 4/2000 |
| DE | 19926782 A1 | 12/2000 |
| DE | 102007014406 B3 | 4/2008 |
| GB | 2285517 A | 7/1995 |
| WO | 2008116862 A1 | 10/2008 |

* cited by examiner

*Primary Examiner* — Hargobind S Sawhney
(74) *Attorney, Agent, or Firm* — Lerner, David, Littenberg, Krumholz & Mentlik, LLP

(57) ABSTRACT

A service apparatus for a transportation means comprises a first component in the form of an air shower with an air inlet and at least one air outlet, and a second component in the form of an illumination device. The first component and the second component are arranged essentially centrically in relation to each other, wherein one of the two components encloses the other component essentially in a ring-shaped manner. In this way an integral reading light with a forced-air nozzle, or an integral forced-air nozzle with a reading light, is implemented that uses little design space.

7 Claims, 5 Drawing Sheets

SERVICE APPARATUS WITH AN ILLUMINATOR AND AN AIR SHOWER

CROSS-REFERENCE TO RELATED APPLICATIONS

This application claims the benefit of the filing date of U.S. Provisional Patent Application No. 61/195,813 filed Oct. 10, 2008, the disclosure of which is hereby incorporated herein by reference.

BACKGROUND OF THE INVENTION

The invention relates to a service apparatus for a transportation means, comprising an air shower with an air inlet and at least one air outlet and an illumination device. The invention further relates to the use of such a service apparatus in a transportation means, as well as to an aircraft comprising at least one such service apparatus.

In modern transportation means it is very common to provide service units in service ducts in order to provide passengers at their locations with convenience elements and safety devices. Such service units also include service apparatuses, which in the context of the present invention refers to apparatuses in which an illumination device for reading, as well as an air shower for enhancing personal convenience are present.

Normally, in known service apparatuses, an air shower and the illumination device are arranged so as to be separate from each other since this makes it considerably easier to connect the components to a source of electric power or a source of air. Thus, for example, DE 199 26 782 B4 and DE 10 2007 014 406 B3 disclose service units in service ducts, in which air showers are separate from illumination devices, and consequently corresponding design space for both components is required in the respective service unit. Apart from taking up design space, such an arrangement is associated with a further, subjective, disadvantage in that it has a conventional and old-fashioned appearance.

BRIEF SUMMARY OF THE INVENTION

It may therefore be an object of the invention to propose a service apparatus by means of which as compact a design as possible is achieved.

This object may be met by a service apparatus according to the features of the independent claim 1. Further advantageous embodiments are stated in the subordinate claims.

According to a first aspect of the invention, a first component in the form of an air shower with an air inlet and at least one air outlet and a component in the form of an illumination device are arranged essentially centrically in relation to each other. One of the two components encloses the other component essentially in a ring-shaped manner. This results in the air shower and the illumination device forming an integral design unit that requires significantly less design space than a forced-air nozzle and an illumination device that are designed so as to be separate of each other. As desired, two different design options for such service apparatuses are available. On the one hand it is possible to provide the air shower as a central component while it is enclosed in a ring-shaped manner by an illumination device. This provides an advantage in that air showers that are readily available in the market may be integrated in the service apparatus according to the invention, and may be enclosed by suitable illumination devices.

Generally-speaking, illumination devices are very flexibly adaptable so that ring-shaped illumination devices or illumination devices comprising several illumination elements that are arranged in a ring shape are imaginable. In contrast to this, it is also realistic to provide as a central component an illumination device that is surrounded by air outlets that are arranged in a ring-shaped manner. However, this would necessitate all the ventilation outlets of the air shower to be connected to a common source of air.

The air shower should preferably be designed such that it may be swivelled in order to change the direction of the jet of outflowing air. This makes it possible to adapt to the individual preference and individual physical size of the passenger wishing to use the air shower. Furthermore, it should be ensured that the air shower may not only be fully closed, but that in addition the quantity of outflowing air may also be adjusted individually.

It could be advantageous if the service apparatus according to the invention comprises at least one active illumination element. This active illumination element could be designed in the form of a light-emitting diode or an incandescent light, wherein a light-emitting diode is to be preferred due to its very favourable current consumption and its very compact design. If several illumination elements are arranged in a ring-shaped manner around an air shower, then only the wiring of the light-emitting diodes or other illumination elements that are used would have to be fed past the air shower to a current supply or the like. This would keep the complexity of a service apparatus according to the invention within clearly acceptable limits.

As an alternative to the above it would also be imaginable to provide a central illumination unit in the service apparatus according to the invention, by means of which illumination unit the illumination device is connected by way of at least one light-guide fibre bundle. This could make it possible to further reduce the current consumption of the illumination device. A central illumination unit could be implemented by means of a central light source with a coupling reflector for coupling light into a light-guide fibre bundle, wherein the central light source could be implemented by means of an LED. Thus, for example, several illumination devices would be supplied with light by the same central illumination unit so that no separate active illumination elements on a single service apparatus are necessary. As soon as none of several service apparatuses according to the invention, which service apparatuses are supplied with light by a common central illumination unit, is to provide light, the central illumination unit may be switched off. This is to take place by means of a corresponding control unit that acquires switch positions of respective passenger seats or other devices.

With the use of a central illumination unit, switching off the light emission takes place differently than with the use of active illumination elements. Preferably, to this effect a closing device is used which is designed to cover light emission apertures of the respective illumination devices. For example, if the illumination device is arranged in a ring shaped manner around the air shower, a ring-shaped closing device with apertures that correspond to the light emission apertures of the illumination device could be arranged in alignment on the illumination device. In order to switch off light emission, the closing device is rotated in such a way that the apertures of the closing device, which apertures correspond to the light emission apertures, are no longer positioned so as to be in alignment with the light emission apertures, and consequently light may no longer pass through.

Preferably, the closing device is furthermore designed, for reducing light emission, to cover up the light emission apertures by means of a material that is not completely transparent. If the particular passenger wishes to use less light than is emitted by the central light unit, the closing device may be positioned on the light emission apertures in such a way that the light emission apertures emit their light to the outside through a material that is not completely transparent, so that the intensity of the light is reduced.

Furthermore, it is preferred to couple the closing device to a drive. This makes it possible to provide a completely encapsulated integration of the illumination device in the service apparatus according to the invention so that a passenger operating the illumination device needs to touch neither the illumination device itself nor the closing device. In particular in the case of modern transportation means, which usually transport a lot of passengers, the illumination device has to be constructed to be sufficiently robust so that even rough manual operation is not detrimental to a long life expectancy of the illumination device. If the closing device is coupled to a drive, the illumination device can, for example, be positioned completely behind a protective screen so that the closing device may be moved entirely by way of remote-control operation. Consequently, the illumination device could be designed to be less robust and smaller.

Furthermore, such a closing device would not have to be positioned directly in front of light emission apertures of an illumination device, but instead it could also be very advantageous if the closing device were to be integrated in the light-guide fibre bundle of a central illumination unit such that already the light guide to the illumination device is interrupted or weakened. Consequently, the closing device could be arranged behind a service duct surface or the like so that it is completely invisible to a user; an arrangement which improves the visual appearance of the illumination device.

A drive for such a closing device could be designed by means of a combination comprising electromagnets and permanent magnets, wherein, for example, a permanent magnet could be positioned between two electromagnets whose poles could be reversed so that it exerts an attracting or repelling force on the permanent magnet, as selected. In this way the closing device could in principle be moved to three different positions: a first position in which a first electromagnet attracts the permanent magnet, and a second electromagnet repels the permanent magnet; a middle position in which both the first and the second electromagnets repel the permanent magnet; a third position in which the first electromagnet exerts a repelling force on the permanent magnet, and the second electromagnet exerts an attracting force. If the closing device is essentially circular or ring-shaped, at least one permanent magnet could be arranged close to its outer circumference, while the electromagnets are to be positioned firmly in the housing and immovable relative to the service apparatus according to the invention. A drive that is designed in this manner is very robust in the face of influences from the external environment, because in principle it is maintenance-free and does not comprise any expensive mechanical elements.

Furthermore, the object is met by the use of such a service apparatus in a transportation means, in particular in an aircraft. Finally, the object is also met by an aircraft comprising at least one service apparatus according to the characteristics of the independent claim 10.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters. The following are shown:

DETAILED DESCRIPTION

Figure 1A:
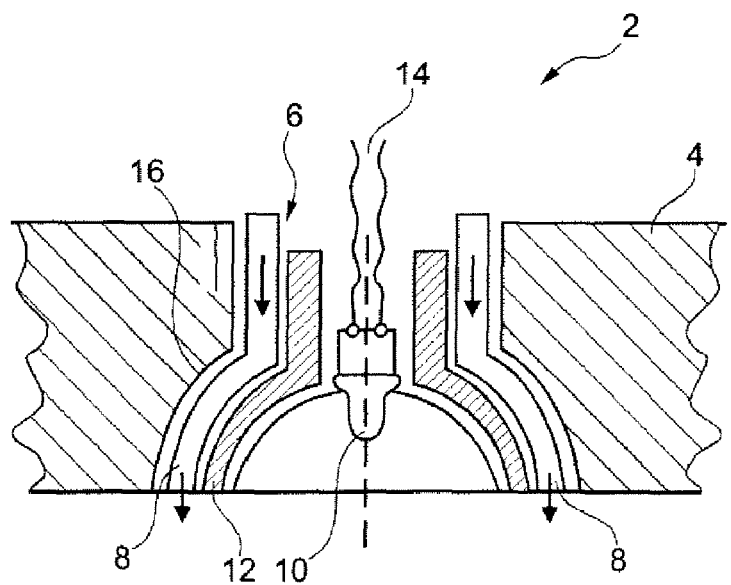
FIG. 1a+b: a section view and a top view of a first exemplary embodiment of the service apparatus according to the invention.

FIG. 1a diagrammatically shows a lateral section of the service apparatus 2 according to the invention, which service apparatus 2 is accommodated in a housing 4 and comprises an air shower 6 with several air outlets 8 that essentially are positioned in a ring-shaped manner around an illumination device 10. Between the air outlets 8 and the illumination device 10 a lamp housing 12 is arranged which together with the illumination device 10 forms a reading light that provides a relatively pronouncedly-bundled light ray.

In the shown first exemplary embodiment of the service apparatus 2 according to the invention the illumination device 10 is designed as a light-emitting diode which by means of cabling 14 is connected to an electrical power network or a corresponding control device (not shown) which switches the illumination device 10 on or off directly by means of switches or by way of a databus or a network.

A horizontal projection of the underside of the service apparatus 2 more clearly shows the way the air outlets 8 are positioned around the illumination device 10. The illumination device 10 forms the centre of the service apparatus 2 according to the invention and together with the lamp housing 12 provides a reading light around which, as an example, seven air outlets 8 are arranged in a ring-shaped manner, from which air issues in an also relatively pronouncedly-bundled jet, so as to provide refreshing air to an individual passenger.

The service apparatus 2 according to the invention is accommodated in a housing 4, wherein the housing 4 may also be part of a service duct which, for example, is located above the passenger seats in the cabin of a commercial aircraft. To this effect an aperture 16 is provided, as is correspondingly shown in FIG. 1a, into which aperture 16 the service apparatus according to the invention may be snapped, or in which aperture 16 the service apparatus 2 may be attached in some other manner.

Figure 1B:
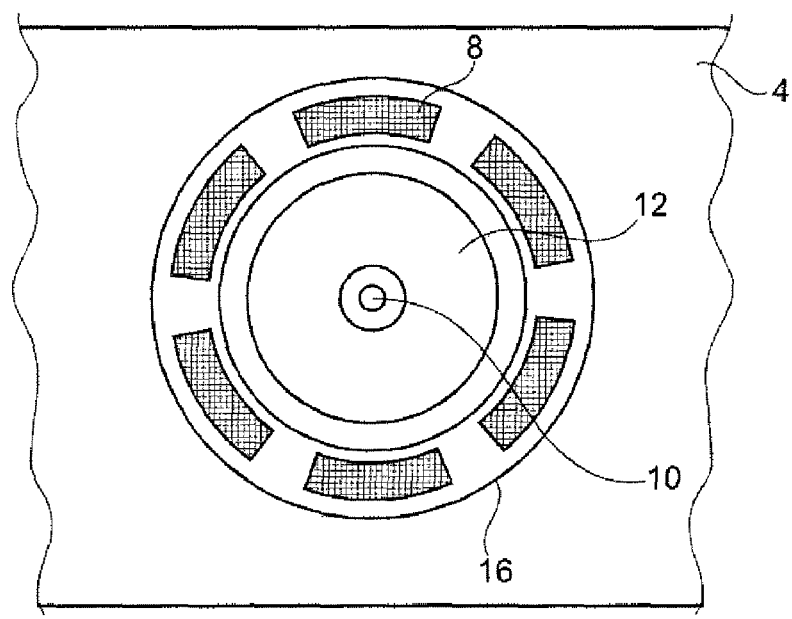

The number of air outlets 8 in this first exemplary embodiment of the service apparatus 2 according to the invention is in no way limited to that shown in FIG. 1b. Instead, any desired number of air outlets 8 is possible, wherein the number is, in particular, based on considerations relating to optics and production technology. For example, a completely ring-shaped individual air outlet 8 could also be implementable which, divided by grids and ribs, comprises a mechanical strength that is necessary for its handling and use.

Preferably, the service apparatus 2 according to the invention is designed in such a way that both the illumination angle and the angle of the air jet may be adjusted individually. To this effect it might be advantageous if, for example, the lamp housing 12 and the totality of the air outlets 8 are essentially in the form of a spherical section so that a ball-joint-like connection of the lamp housing 12 in the air outlets 8 is created, and also a ball-joint-like connection between the air outlets 8 and the housing 4. In this context the drawings should be considered as not being to scale.

Figure 2A:
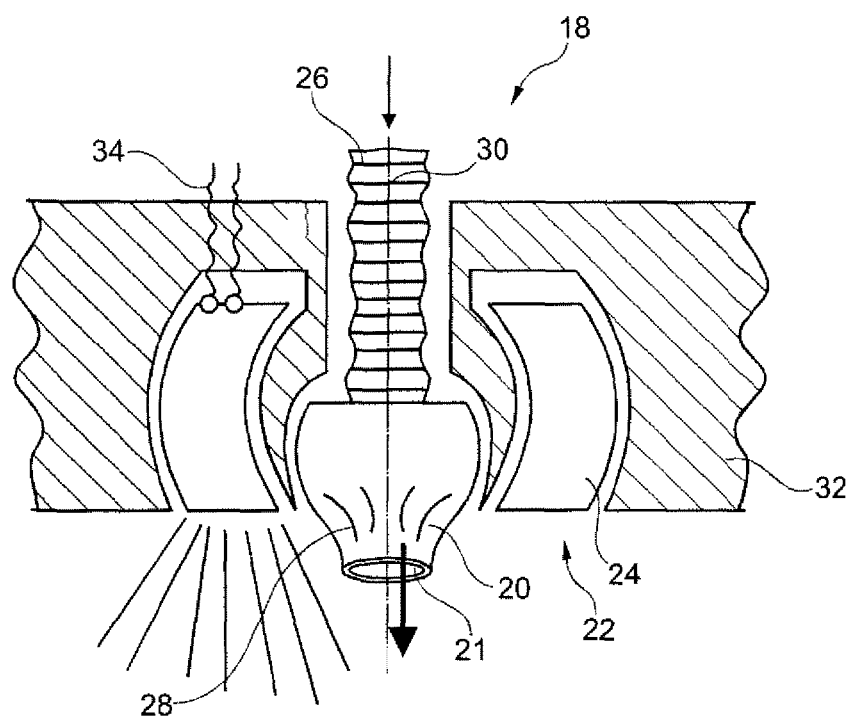
FIG. 2a+b: a section view and a top view of a second exemplary embodiment of the service apparatus according to the invention.

FIG. 2a shows a second exemplary embodiment of a service apparatus 18 according to the invention, in which embodiment the principle presented in FIG. 1a is reversed. Thus, FIG. 2a shows an air shower 20 with an air outlet 21, which air shower 20 forms the central element of the service apparatus 18 according to the invention and is enclosed in a ring-shaped manner by an illumination device 22 comprising several illumination elements 24. The air shower 20 is connected to an air conditioning system by way of a hose 26 or some other air line and is essentially designed in the manner of known or conventional air showers. This means that the air shower 20, for example, comprises ribbing 28 at its top, which ribbing 28 makes it possible to rotate the air shower 20 on its vertical axis 30 for opening or closing it. At least in some regions the air shower 20 is in the shape of a spherical section and consequently may be swivelled in a housing 32 in the manner of a ball joint. This makes it possible to individually adjust the angle of the air jet.

The illumination elements 24 that are arranged around the air shower 20 can, for example, be designed as light-emitting diodes that may be connected to an on-board voltage supply by way of cabling 34 or a corresponding control device. All types of illumination means that in as small a space as possible may provide adequate illumination density may be considered. The combination of the illumination elements 24 and the housing 32 overall provides a reading light whose centre comprises an air shower 20.

Figure 2B:
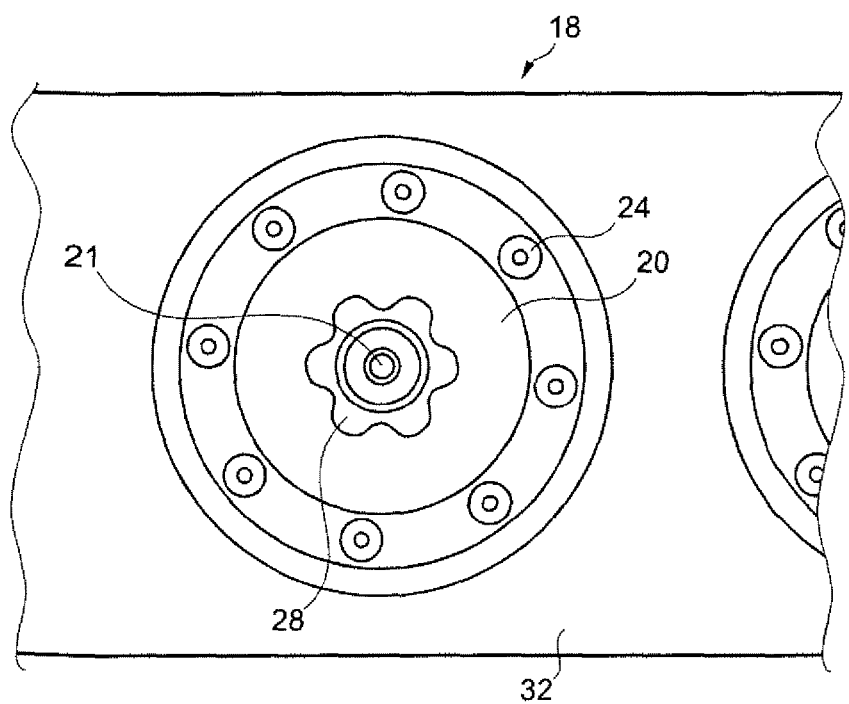

FIG. 2b shows a horizontal projection of the underside of the service apparatus 18 according to the invention. As an example, eight illumination elements 24 are shown which are arranged in a ring-shaped manner around the air shower 20. By means of a corresponding mechanical interconnection of the illumination elements 24 and the spherical shape shown in FIG. 2a, the illumination device 22 in the housing 32 may also be swivelled so that the direction of the light beam may be adjusted.

In this context, too, it should be noted that the service apparatus 18 according to the invention is in no way limited to the use of the number of illumination elements 24 shown in FIG. 2b. For example, any number of illumination elements 24 could be used, which, if desired, could make it possible, in particular, to enhance the visual appearance of the service apparatus 18 according to the invention. Furthermore, the service apparatus 18 according to the invention is not limited to the design of the air shower 20 shown.

Figure 3A:
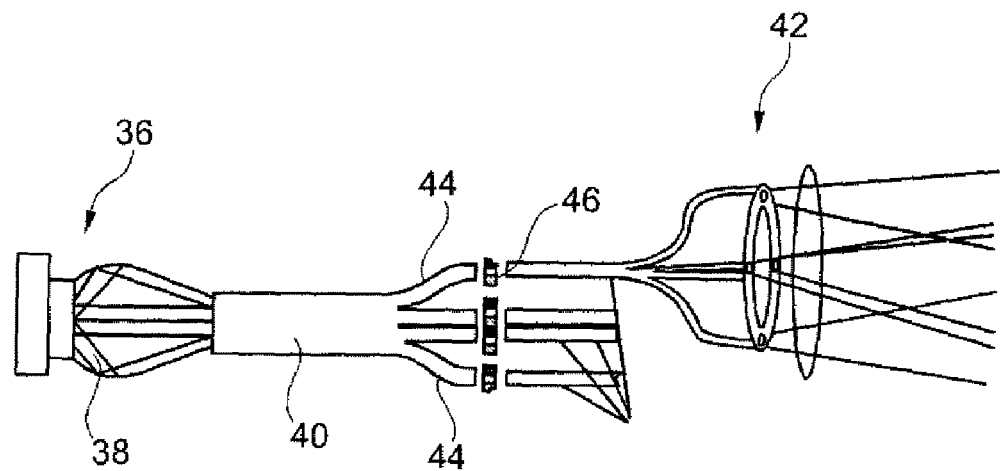
FIG. 3a+b: a diagrammatic view of a central illumination unit.

FIG. 3a diagrammatically shows a central illumination unit 36 which by way of a coupling reflector 38 introduces light into a light-guide fibre bundle 40, by means of which said light is guided to individual service apparatuses 42 according to the invention. To this effect the light-guide fibre bundle 40 is divided into subordinate bundles 44, by means of which in each case a service apparatus according to the invention is supplied with light. The individual subordinate bundles 44 may be optically interrupted by means of closing devices 46, or said subordinate bundles 44 may dim the intensity of the light guided through. Below, the closing device will be discussed in more detail.

Figure 3B:
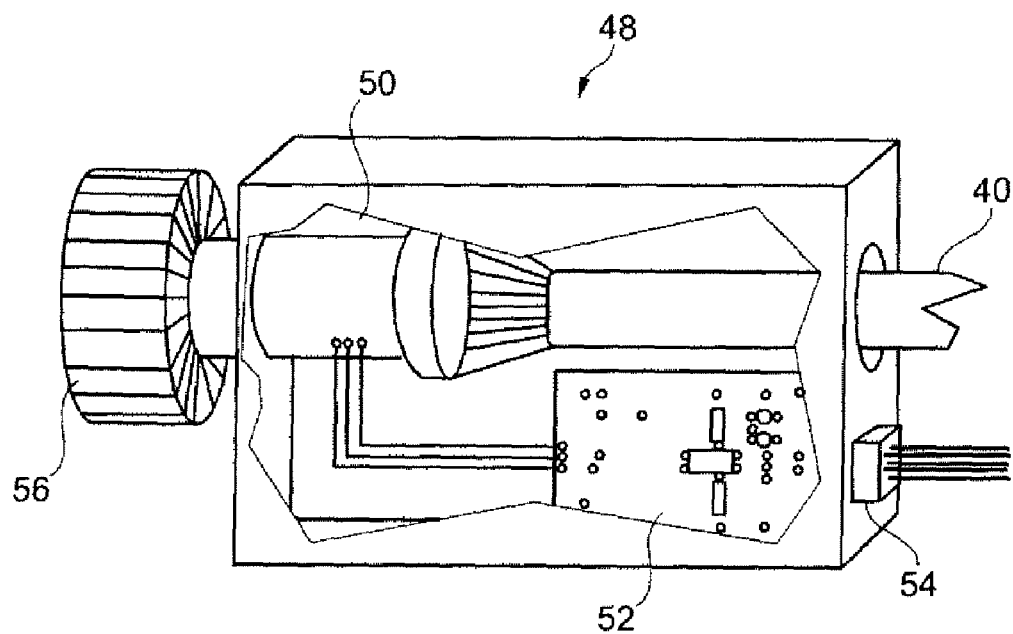

FIG. 3b shows a preferred embodiment of an illumination device 48 that comprises a central illumination unit 50 that is electrically connected to a control unit 52. The control unit 52 could, for example, supply the central illumination unit 50 with a constant voltage and a constant current, and if no light emission is required, on the basis of switching states or switching data on a signal input or data input 54 could switch them off or on again. The central illumination unit 50 could, for example, be designed as an LED which is passively cooled by means of a heat sink 56. Light is emitted into a light-guide fibre bundle 40, with said light being guided to the service apparatuses according to the invention.

Figure 4A:
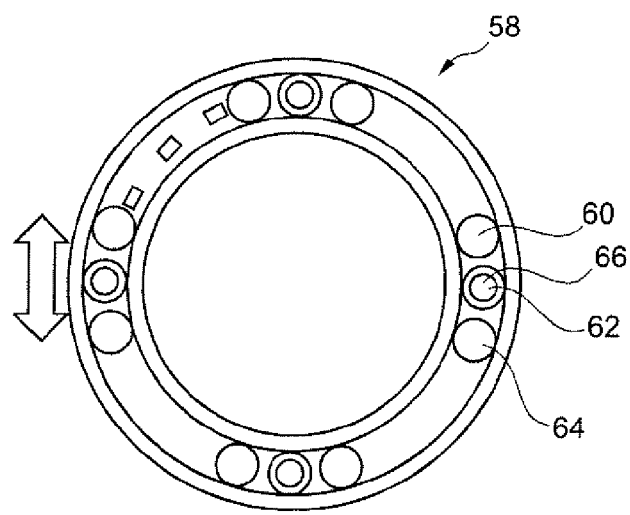
FIG. 4a-c: a third exemplary embodiment of the service apparatus according to the invention.
Figure 4B:
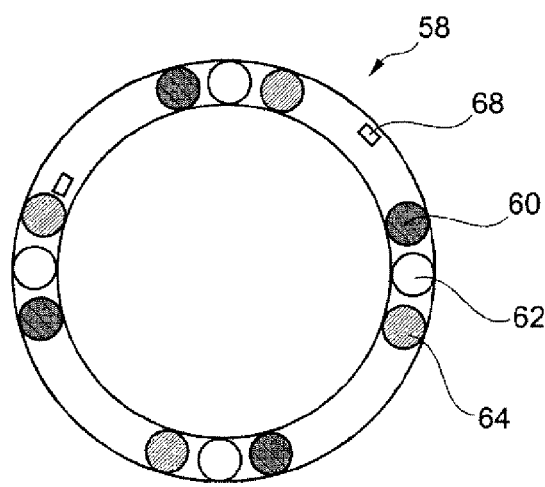

FIG. 4a shows a closing device 58 that is designed to cover the light that is guided through a light-guide fibre bundle, or to reduce the intensity of said light. To this effect the closing apparatus comprises three corresponding capsules 60, 62 and 64 for each light-guide fibre bundle. In the exemplary embodiment shown, four light-guide fibre bundles are guided to four illumination elements in the service apparatus 2, 18 or 42 according to the invention, and consequently there are a total of 12 capsules 60, 62 and 64 on the closing device 58. Capsule 60 represents the function of dimmed light, which function is indicated in FIG. 4b by the lightly shaded appearance. Capsule 62 is a fully light-permeable capsule which in FIG. 4a is correspondingly arranged in each case with a light aperture 66. The capsules 64 represent switched-off light so that these capsules are preferably completely light-impermeable.

Figure 4C:
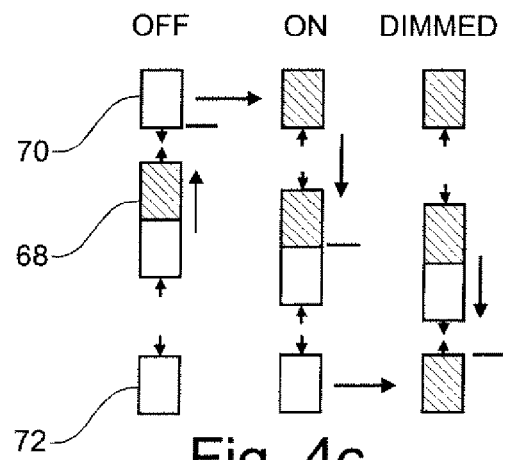

For the purpose of excursion of this closing device 58, permanent magnets 68 could be arranged on the service apparatus 58, onto which closing device 58 forces for movement could be exerted by way of switchable electromagnets 70 and 72. FIG. 4c shows three different operating modes for this.

In the left-hand operating mode, designated "OFF", the electromagnet 70 exerts an attractive force on the permanent magnet 68, while the electromagnet 72 exerts a repelling force. Correspondingly, the permanent magnet 68 points to the electromagnet 70 so that the closing device is in a position in which the light-impermeable capsules 64 are positioned so as to correspond to the light apertures 66. In the second operating mode, in FIG. 4c designated "ON", both electromagnets 70 and 72 exert a repelling force on the permanent magnet 68 so that it is in a middle position with the light-permeable capsule 62 being positioned so as to correspond to the light apertures 66. In a third operating mode, in which the light is guided through the corresponding light-guide fibre bundle only in a dimmed manner, the electromagnet 70 exerts a repelling force on the permanent magnet 68, while the electromagnet 72 exerts an attractive force on said permanent magnet 68. Consequently the partly-permeable capsule 60 is arranged so as to correspond to the light apertures 66, and the light is guided into the light-guide fibre bundle only in a reduced manner.

As shown in FIG. 3a, a closing device 58, which in FIG. 3a is designated 46, may be arranged within the corresponding light-guide fibre bundle 40 or 44. On the other hand it would, however, also be possible to arrange the closing device 58 in front of the light apertures of the service apparatus according to the invention, in other words adjacent to the illumination device around the forced-air nozzle.

Figure 5:
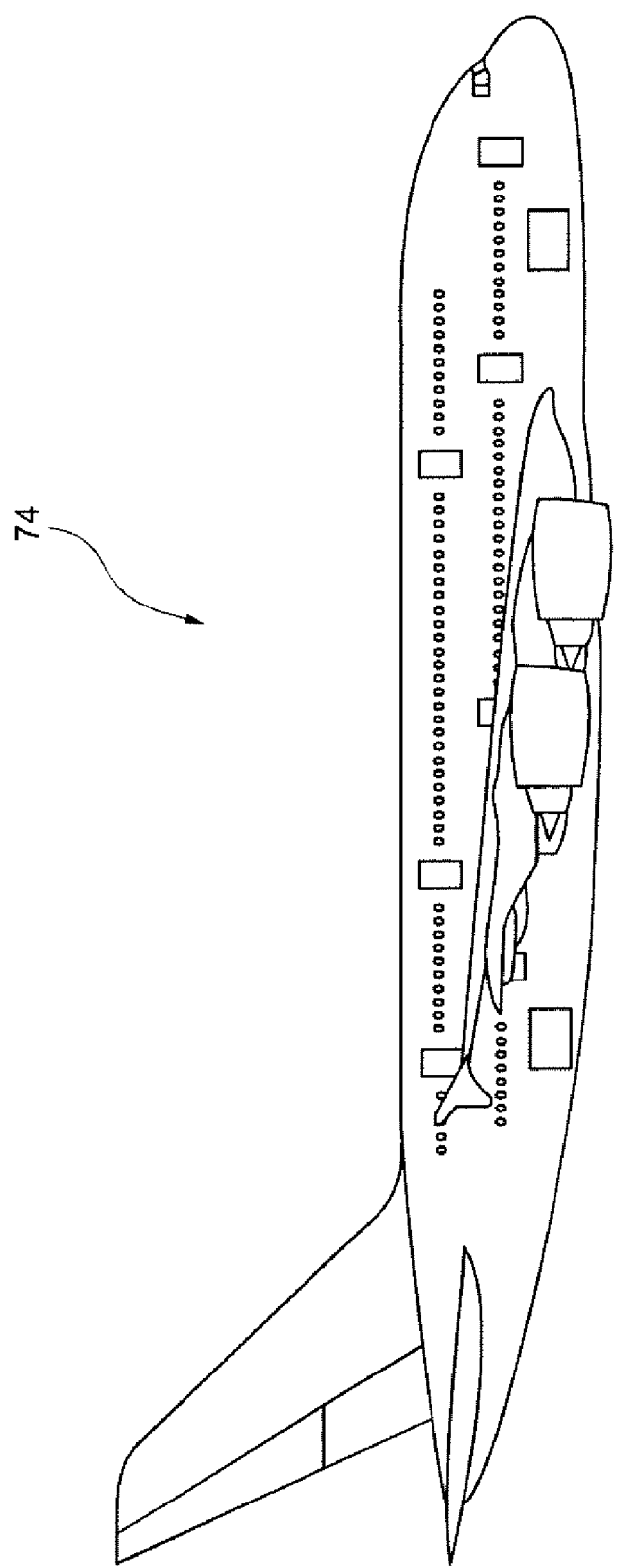
FIG. 5: an aircraft comprising at least one service apparatus according to the invention.

Finally, FIG. 5 shows a modern commercial aircraft 74 that may be equipped with such service apparatuses.

It will be appreciated that by "essentially centrically" it is not meant that first and second components must share a common central axis. One can be offset from the other. Moreover, by the terms "encloses the other" and "essentially in a ring-shape" it will be understood that the overall shape of the elements, such as vent(s) and/or light(s), need not be round nor need one completely enclose the other. The outer component will generally surround the inner component, although as illustrated, there may be gaps between individual portions of the elements. And the gaps need not be equal. For example, FIG. 1b illustrates a series of equally spaced air outlets generally surrounding an inner light element. One or more of these air outlets could be eliminated and still fall within the meaning of these terms. A single continuous air outlet that completely surrounds the light, or a single air outlet that surrounds, for example, only about 270 degrees, would also satisfy these terms.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

List of reference characters
2 Service apparatus
4 Housing
6 Air shower
8 Air outlet
10 Illumination device
12 Lamp housing
14 cabling
16 Aperture
18 Service apparatus
20 Air shower
21 Air outlet
22 Illumination device
24 Illumination element
26 Hose
28 Ribbing
30 Vertical axis
32 Housing
34 Cabling
36 Central illumination unit
38 Coupling reflector
40 Light-guide fibre bundle
42 Service apparatus
44 Subordinate bundle
46 Closing device
48 Illumination device
50 Central illumination unit
52 Control unit
54 Signal input or data input
56 Heat sink
58 Closing device
60 Capsule
62 Capsule
64 Capsule
66 Light emission aperture
68 Permanent magnet
70 Electromagnet
72 Electromagnet
74 Aircraft

The invention claimed is:

1. A service apparatus for a vehicle, comprising:
a first component in the form of an air shower comprising at least one air outlet; and
a second component in the form of an illumination device,
wherein the first component and the second component are arranged essentially centrically in relation to each other, and one of the two components encloses the other component essentially in a ring-shaped manner;
wherein the illumination device comprises a closing device to cover light emission apertures of the illumination device; and wherein the closing device comprises a permanent magnet which is arranged between two electromagnets of the electric drive; and wherein poles of the electromagnets are electrically reversible such that they exert an attracting or repelling force on the permanent magnet
wherein the closing device is coupled to an electric drive.

2. The service apparatus of claim 1, wherein the illumination device encloses the forced-air nozzle essentially in a ring-shaped manner.

3. The service apparatus of claim 1, wherein the air shower comprises several air outlets that are arranged in a ring-shaped manner around the illumination device.

4. The service apparatus of claim 1, wherein the illumination device comprises at least one active illumination element.

5. The service apparatus of claim 1, wherein the illumination device is connected by way of at least one light-guide fibre bundle to a central illumination unit.

6. The service apparatus of claim 1, wherein the closing device is further equipped to cover the light-emission apertures with a material that is not completely transparent in order to reduce light emission.

7. An aircraft with at least one service apparatus comprising:
a first component in the form of an air shower comprising at least one air outlet; and
a second component in the form of an illumination device,
wherein the first component and the second component are arranged essentially centrically in relation to each other, and one of the two components encloses the other component essentially in a ring-shaped manner;
wherein the illumination device comprises a closing device to cover light emission apertures of the illumination device; and
wherein the closing device is coupled to an electric drive wherein the closing device comprises a permanent magnet which is arranged between two electromagnets of the electric drive; and wherein poles of the electromagnets are electrically reversible such that they exert an attracting or repelling force on the permanent magnet.

* * * * *

UNITED STATES PATENT AND TRADEMARK OFFICE
CERTIFICATE OF CORRECTION

| | |
|---|---|
| PATENT NO. | : 8,100,547 B2 |
| APPLICATION NO. | : 12/573977 |
| DATED | : January 24, 2012 |
| INVENTOR(S) | : Robert Hogh et al. |

Page 1 of 1

It is certified that error appears in the above-identified patent and that said Letters Patent is hereby corrected as shown below:

In the Claims:

Col. 8, Line 13, after "device; and" insert from Col. 8, Line 19, --wherein the closing device is coupled to an electric drive.--.

Col. 8, Line 18, insert --.-- after magnet.

Col. 8, Line 19, delete "wherein the closing device is coupled to an electric drive.".

Col. 8, Line 48, insert --;-- after electric drive.

Signed and Sealed this
Ninth Day of July, 2013

Teresa Stanek Rea
*Acting Director of the United States Patent and Trademark Office*